(12) United States Patent
Kii

(10) Patent No.: US 8,120,418 B2
(45) Date of Patent: Feb. 21, 2012

(54) LARGE-SCALE INTEGRATED CIRCUIT

(75) Inventor: Yasuyuki Kii, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 12/262,069

(22) Filed: Oct. 30, 2008

(65) Prior Publication Data
US 2009/0108928 A1    Apr. 30, 2009

(30) Foreign Application Priority Data

Oct. 31, 2007   (JP) ................. 2007-284433

(51) Int. Cl.
*H01L 49/02*    (2006.01)
(52) U.S. Cl. .......... 327/564; 327/407; 327/99; 710/110; 710/260; 710/300; 712/205
(58) Field of Classification Search .................. 327/564, 327/407, 99; 710/110–113, 260–267, 300–309; 712/205, 214
See application file for complete search history.

(56) References Cited

U.S. PATENT DOCUMENTS 6,653,871 B2 * 11/2003 Masuda et al. .................. 327/99
7,395,520 B2 * 7/2008 Shimamura et al. ............. 710/8

FOREIGN PATENT DOCUMENTS

| JP | 2-128266 | 5/1990 |
| JP | 7-78876 A | 3/1995 |
| JP | 8-95744 | 4/1996 |

* cited by examiner

*Primary Examiner* — Lincoln Donovan
*Assistant Examiner* — Shikha Goyal
(74) *Attorney, Agent, or Firm* — Birch, Stewart, Kolasch & Birch, LLP

(57) ABSTRACT

A large-scale integrated circuit according to the present invention includes a plurality of functional blocks for independently performing a signal processing operation, and a selection controlling circuit for generating a first control signal to select one of the plurality of functional blocks, in which the selection controlling circuit includes a control signal generating circuit for generating a second control signal for stopping the operation of its circuit, and the selection controlling circuit generates the first and the second control signals by a command from a different control circuit.

12 Claims, 12 Drawing Sheets

FIG.7

| CTRL1[1] | CTRL1[0] | SEL1 | SEL2 | SEL3 |
|---|---|---|---|---|
| 0b | 0b | enable | disable | disable |
| 0b | 1b | disable | enable | disable |
| 1b | 0b | disable | disable | enable |

FIG.8

| CTRL2 | SEL4 |
|---|---|
| 0b | enable |
| 1b | disable |

FIG.10

| ADDR[31:16] | CTRL1[1:0] | CTRL2 | SEL1 | SEL2 | SEL3 | SEL4 |
|---|---|---|---|---|---|---|
| 1000h | 00b | don't care | enabled | disabled | disabled | disabled |
| | other than 00b | don't care | disabled | disabled | disabled | disabled |
| 2000h | 01b | don't care | disabled | enabled | disabled | disabled |
| | other than 01b | don't care | disabled | disabled | disabled | disabled |
| 3000h | 10b | don't care | disabled | disabled | enabled | disabled |
| | other than 10b | don't care | disabled | disabled | disabled | disabled |
| 4000h | don't care | 0b | disabled | disabled | disabled | enabled |
| | don't care | 1b | disabled | disabled | disabled | disabled |
| other than the above | don't care | don't care | disabled | disabled | disabled | disabled | when CTRL1[1:0]=10、CTRL2=1時

FIG.13

| ADDR | D7 | D6 | D5 | D4 | D3 | D2 | D1 | D0 |
|---|---|---|---|---|---|---|---|---|
| 4000_0000h | - | - | - | - | - | CTRL2 | CTRL1[1] | CTRL1[0] |

LARGE-SCALE INTEGRATED CIRCUIT

This nonprovisional application claims priority under 35 U.S.C. §119(a) to Patent Application No. 2007-284433 filed in Japan on Oct. 31, 2007, the entire contents of which are hereby incorporated by reference.

BACKGROUND OF THE INVENTION

1. Field of the Invention

The present invention relates to a large-scale integrated circuit, and in particular to a large-scale integrated circuit that utilizes an existing circuit configuration, and is added to a circuit for expanding functions and correcting a malfunction of the existing circuit.

2. Description of the Related Art

Conventionally, it has been an problem to maintain the functions of an existing device while achieving new functions when a new device is designed by expanding the existing device.

For example, in the field of game machines where compatibility is a serious consideration, there are new game machines that have backward compatibility for existing game machines.

For example, in a case with a game machine A, an LSI chip of an existing game machine A is installed in a new game machine A in order for the new game machine A to have backward compatibility for the existing game machine A. Further, in a case with a game machine B, software emulation for an existing game machine B is performed on a new game machine B in order for the new game machine B to have backward compatibility for the existing game machine B. Conventional game machines have added new functions while maintaining their compatibility in such methods.

However, in the game machine A method for mounting a chip of the existing game machine on a system, two chips, that is an old chip for achieving functions of the existing game machine and a new chip for achieving functions of a new game machine, are implemented on a substrate, causing the cost for the overall system to increase. Further, in the game machine B method for emulating the existing game machine in the new game machine, there is a possibility of not achieving 100% backward compatibility, where there may be software that does not run.

Reference 1 discloses a way to change the functions of an LSI by integrating a plurality of functional blocks on one LSI chip, and allowing only specific functional blocks to be effective with an external terminal.

Specifically, the LSI disclosed in the reference configures a plurality of circuit blocks in one gate array, and the LSI sets one of the plurality of blocks in an operational state based on a mode setting signal provided from outside for a mode setting terminal, and connects a circuit block, which is set in the operational state, and an external connecting terminal so that data can be transferred.

For example, an LSI with such a configuration is equipped with a compatible circuit having compatibility with an existing LSI as a first circuit block, and a new circuit added with a new function to the functions of the existing LSI as a second circuit block. The LSI switches these circuits with an external terminal, so that a compatible LSI having compatibility with the existing LSI and a new LSI having no compatibility with the existing LSI can be achieved within one LSI. Herein, the compatible LSI allows only the first circuit block to be operational by the setting of an external terminal. The new LSI allows only the second circuit block to be operational by the setting of an external terminal.

Reference 1: Japanese Laid-Open Publication No. 7-78876

SUMMARY OF THE INVENTION

As described above, the configuration of the LSI disclosed in Reference 1 is capable of having a plurality of functions in one LSI. However, a new device with backward compatibility is required to have a configuration to implement two LSIs such as a compatible LSI and a new LSI on a substrate and use either one. After all, the cost for the overall system increases even when the configuration of the LSI disclosed in Reference 1 is used, as similar to the game machine A method described above.

It is possible to contrive the LSI disclosed in Reference 1 so that one LSI dynamically switches and operates both the compatible circuit and the new circuit implemented on the substrate by using a universal terminal of an LSI chip to dynamically switch mode setting signals to a mode setting terminal.

For example, the following configuration is conceivable for a case where a gate array disclosed in Reference 1 described above is an LSI that achieves a game machine. In the LSI chip that achieves a new game machine, the first circuit block having compatibility with the existing game machine operates when software compatible with the existing game machine is installed in the new game machine. At the same time, a mode setting signal is output to a mode setting terminal so that circuit blocks other than the first circuit block will be in a nonoperational state. On the other hand, in the LSI chip that achieves a new game machine, the second circuit block that achieves a new circuit operates when software compatible with the new game machine is attached to the new game machine. At the same time, a mode setting signal is output to the mode setting terminal so that circuit blocks other than the first circuit block will be in a nonoperational state.

However, even when one LSI can be somehow configured to operate both the compatible circuit and the new circuit as described above, the compatible circuit and the new circuit are configured to be totally independent circuit blocks in the LSI, resulting in the increase of the circuit size of the LSI. Furthermore, a problem to be solved still remains where an unexpected operational malfunction occurs by mistakenly changing an output signal from the universal terminal.

The present invention is intended to solve the conventional problems described above. The objective of the present invention is to provide a large-scale integrated circuit that is capable of achieving a new function while maintaining backward capability with the existing circuit by adding a small circuit, and is capable of preventing malfunctioning due to switching between a compatible operation mode and a new operation mode in the existing circuit.

A large-scale integrated circuit according to the present invention includes: a plurality of functional blocks for independently performing a signal processing operation; and a selection controlling circuit for generating a first control signal to select one of the plurality of functional blocks, in which the selection controlling circuit includes a control signal generating circuit for generating a second control signal for stopping the operation of its circuit; and in which the selection controlling circuit generates the first and the second control signals by a command from a different control circuit, thereby achieving the objective described above.

Preferably, a large-scale integrated circuit according to the present invention further includes: a central processing unit as the different control circuit; and a bus system for connecting the central processing unit and the selection controlling circuit.

Still preferably, in a large-scale integrated circuit according to the present invention, the plurality of functional blocks are circuit blocks that are connected to the selection controlling circuit and the central processing unit through the bus system.

Still preferably, in a large scale integrated circuit according to the present invention, one of the plurality of functional blocks is a circuit block for achieving a compatible circuit having compatibility with an existing large-scale integrated circuit.

Still preferably, in a large-scale integrated circuit according to the present invention, one of the plurality of functional blocks is a circuit block for achieving a new circuit having no compatibility with an existing large-scale integrated circuit.

Still preferably, in a large-scale integrated circuit according to the present invention, one of the plurality of functional blocks is a circuit block for achieving a common circuit function with an existing large-scale integrated circuit.

Still preferably, in a large-scale integrated circuit according to the present invention, one of the plurality of functional blocks is a malfunction corrected circuit, in which an existing circuit malfunction of a particular functional block in an existing large-scale integrated circuit is corrected; and the selection controlling circuit generates, between a circuit configuration including an original circuit malfunction in the existing large-scale integrated circuit and a circuit configuration with the corrected circuit malfunction, a control signal for switching a circuit configuration of the large-scale integrated circuit.

Still preferably, in a large-scale integrated circuit according to the present invention, another one of the plurality of functional blocks is a malfunction non-corrected circuit that has the same circuit configuration as a particular functional block including the circuit malfunction, and the selection controlling circuit generates a control signal for selecting either of the malfunction non-corrected circuit or the malfunction corrected circuit.

Still preferably, in a large-scale integrated circuit according to the present invention, one of the plurality of functional blocks is a function expanding circuit for expanding a particular circuit function in an existing large-scale integrated circuit, and the selection controlling circuit generates a control signal for selecting either to use the particular circuit function as is or to use an expansion function, in which the particular circuit function is expanded.

Still preferably, in a large-scale integrated circuit according to the present invention, another one of the plurality of functional blocks is an existing circuit having the same circuit configuration as a circuit having the particular circuit function; and the selection controlling circuit generates a control signal for selecting either the existing circuit or the function expanding circuit.

Still preferably, in a large-scale integrated circuit according to the present invention, one of the plurality of functional blocks is an independent functional circuit for performing a signal processing operation independent from a particular circuit in an existing large-scale integrated circuit; and the selection controlling circuit generates a selection control signal for selecting whether or not to operate the independent functional circuit.

Still preferably, in a large-scale integrated circuit according to the present invention, another one of the plurality of functional blocks is an existing circuit having the same circuit configuration with a particular circuit in an existing large-scale integrated circuit; and the selection controlling circuit generates a control signal for selecting either the existing circuit or the independent functional circuit.

A large-scale integrated circuit according to the present invention includes: at least one functional block for performing a signal processing operation; a clock generating circuit for generating a system clock provided for the functional block; and a selection controlling circuit for generating a first control signal to select a frequency of the generated system clock among a plurality of frequencies, in which the selection controlling circuit includes a control signal generating circuit for generating a second control signal for stopping the operation of its circuit; and in which the selection controlling circuit generates the first and the second control signals by a command from a different control circuit, thereby achieving the objective described above.

Preferably, in a large-scale integrated circuit according to the present invention, the functional block is a circuit block, in which an operation at the same operation speed with an existing circuit and an operation at an operation speed faster than an operation speed of the existing circuit are switched by a frequency of an inputted system clock.

The functions of the present invention having the structures described above will be described hereinafter.

According to the present invention, the large-scale integrated circuit (LSI system) includes a plurality of functional blocks for independently performing a signal processing operation, and a selection controlling circuit for generating a first control signal to select one of the plurality of functional blocks, where the selection controlling circuit generates a second control signal for stopping the operation of itself. Therefore, when the system recognizes that the system needs to operate in a compatible mode, the system sets the selection controlling circuit so that various functional blocks will have the same function as the existing compatible function. Subsequently, the system stops the operation of the selection controlling circuit itself, so that a transit from a complete compatible state into another state by mistake can be prevented. In addition, when the system recognizes that the system needs to operate in a new mode, the system sets the selection controlling circuit so that various functional blocks will be able to use a new function. Subsequently, the system stops the operation of the selection controlling circuit itself as needed, so that the change of the functions of the various functional blocks by mistake can be prevented.

In addition, the selection controlling circuit can change the setting from a controlling circuit, such as CPU, in which the software operates, so that the merit is that the circuit state of the LSI can be changed upon examining the media inserted into a DVD drive, for example, is whether game software for the old game machine or game software for the new game machine after the LSI system is started.

In addition, according to the present invention, the compatible circuit and the new circuit are not required to be implemented totally independently, and circuits having similar functions (e.g., an interface circuit and a TV output circuit for a DVD drive) can be shared by the old game machine and the new game machine.

Further, according to the present invention, an expanded circuit only has to be added to the old circuit to share many portions of the old circuit for a circuit having not totally but substantially the same function (e.g., a circuit having a small expansion provided therein such as adding two key input terminals in the new game machine compared to the old game machine). As a result, a new game machine can be achieved with the addition of a small circuit, compared to the case where totally independent compatible circuit and a new circuit are included.

According to the present invention with the configuration described above, it is possible to provide a large-scale integrated circuit that is capable of achieving a new function while maintaining backward capability with the existing circuit by adding a small circuit and is capable of preventing malfunctioning due to switching between a compatible operation mode and a new operation mode in the existing circuit.

These and other advantages of the present invention will become apparent to those skilled in the art upon reading and understanding the following detailed description with reference to the accompanying figures.

BRIEF DESCRIPTION OF THE DRAWINGS

FIG. 7 is a diagram illustrating a large-scale integrated circuit according to Embodiment 1, indicating an exemplary association between a CTRL1 [1:0] signal and SEL 1 to 3 signals in the large-scale integrated circuit.

FIG. 8 is a diagram illustrating a large-scale integrated circuit according to Embodiment 1, indicating an exemplary association between a CTRL2 signal and a SEL4 signal in the large-scale integrated circuit.

FIG. 10 is a diagram illustrating a large-scale integrated circuit according to Embodiment 1, indicating an exemplary relationship among an ADDR signal, a CTRL1 [1:0] signal, a CTRL2 signal, and SEL 1 to 4 signals in the large-scale integrated circuit.

FIG. 13 is a diagram illustrating a large-scale integrated circuit according to Embodiment 1, indicating an example of a control register in a system setting circuit in the large-scale integrated circuit.

Figure 1:
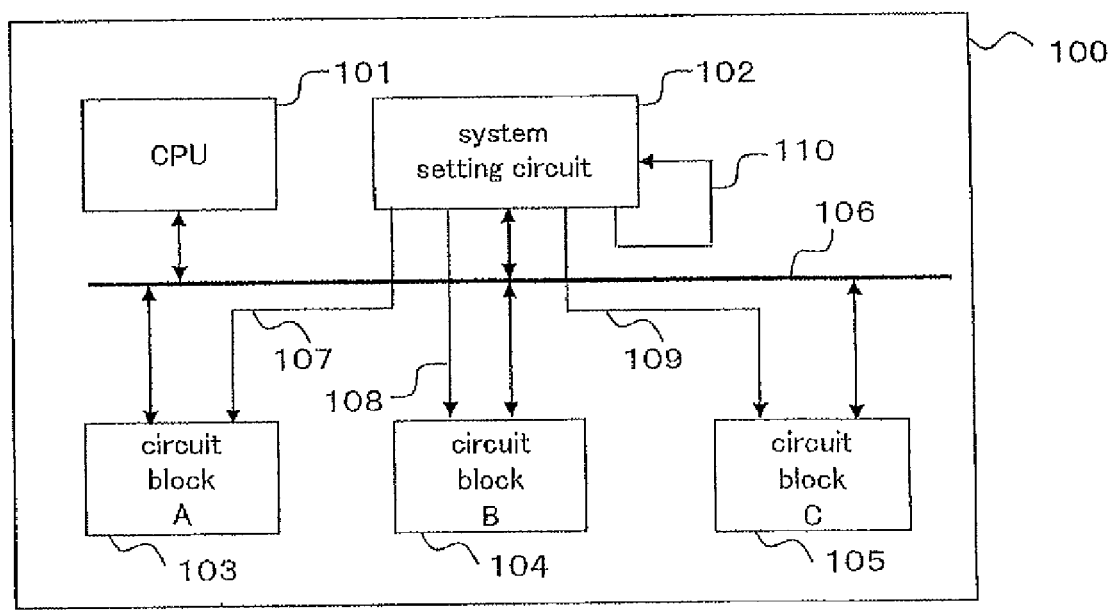
FIG. 1 is a block diagram illustrating a large-scale integrated circuit according to Embodiment 1 of the present invention.

100, 100a to 100d large-scale integrated circuit
101, 101a to 101d CPU
102, 102a to 102d system setting circuit
103 circuit block A
104 circuit block B
105 circuit block C
106 bus system (bus)
107 circuit block A enable disable selection signal (block selection signal)
108 circuit block B enable disable selection signal (block selection signal)
109 circuit block C enable disable selection signal (block selection signal)
110 system setting circuit enable disable selection signal
111 DMAC
200 centralized arbiter
201 centralized decoder
202 ADDR selecting selector
203 WDATA selecting selector
204 RDATA selecting selector
300 circuit block D
301 malfunctioning circuit section E
302 malfunction corrected circuit section E'
303 selector
303a malfunction correcting enable disable selection signal
400 circuit block G
401 existing circuit section H
402 function expansion circuit section H'
403 AND circuit
403b function expansion enable disable selection signal
500 clock generating circuit
501 system clock mask signal 1
502 system clock mask signal 2
503 system clock source oscillation
504 system clock mask selection selector
505 circuit block I system clock selection signal
506 clock gate circuit
507 circuit block I
600 existing circuit block J
601 new independent circuit block K
602 new independent circuit block enable disable selection signal

DESCRIPTION OF THE PREFERRED EMBODIMENTS

Hereinafter, embodiments of the present invention will be described.

Embodiment 1

FIG. 1 is a block diagram illustrating a large-scale integrated circuit according to Embodiment 1 of the present invention.

A large-scale integrated circuit 100 of Embodiment 1 as illustrated in FIG. 1 includes a control circuit 101 such as a Central Processing Unit (referred to as CPU hereinafter), a system setting circuit 102, various circuit blocks A 103, B 104 and C 105, and a bus system 106 for connecting the various circuit blocks.

Herein, the system setting circuit 102 outputs a block selection signal 107, 108 or 109 to select any one of the circuit blocks A to C. In addition, the system setting circuit 102 outputs a selection signal 110 for disabling the circuit function of itself (i.e., for stopping the operation of the circuit of itself).

The CPU 101 described above outputs two kinds of commands for the respective selection signals described above to the system setting circuit 102 through the bus system 106. One of the commands (first command) from the CPU 101 enables only one of the circuit blocks A to C and disables the rest of the two blocks. When the system setting circuit 102 receives the first command, the system setting circuit 102 enables any one selection signal of the selection signals 107, 108 and 109 described above and disable the rest of the two signals.

The circuit blocks A to C described above operate in accordance with the selection signals 107 to 109. For example, the circuit block A performs normal operations when the selection signal 107 is enabled, and the circuit block A is set in an on-operational state when the selection signal 107 is disabled. The circuit blocks B and C also perform the similar function for the signals 108 and 109.

Further, the other of the commands (the second command) disables the system setting circuit 102 itself. When the system setting circuit 102 receives the second command, the system setting circuit 102 changes the selection signal 110 from the enable state, which is an initial state, into a disable state. The system setting circuit 102 operates in accordance with the selection signal 110. The system setting circuit 102 performs operations when the selection signal 110 shows an enabled state, and the system setting circuit 102 turns into a non-operational state (operation stop state) when the selection signal 110 shows a disabled state.

Because of such a circuit configuration, the large-scale integrated circuit 100 is able to select one of the circuit blocks A to C while in operation, using the CPU 101. Further, because of the function for disabling the setting circuit itself, the large-scale integrated circuit 100 is able to reject the block selection after disablement. As a result, it is possible to prevent unintended circuit blocks from being selected by mistake.

For example, according to the large-scale integrated circuit 100 of Embodiment 1, the large-scale integrated circuit 100 can be set as a game machine capable of achieving a new function while maintaining backward compatibility with an existing game machine when the circuit block A is set to be a compatible circuit having compatibility with an existing game machine and the circuit blocks B and C are set to be a new circuit for achieving the new function that does not exist in the existing game machine.

Figure 2:
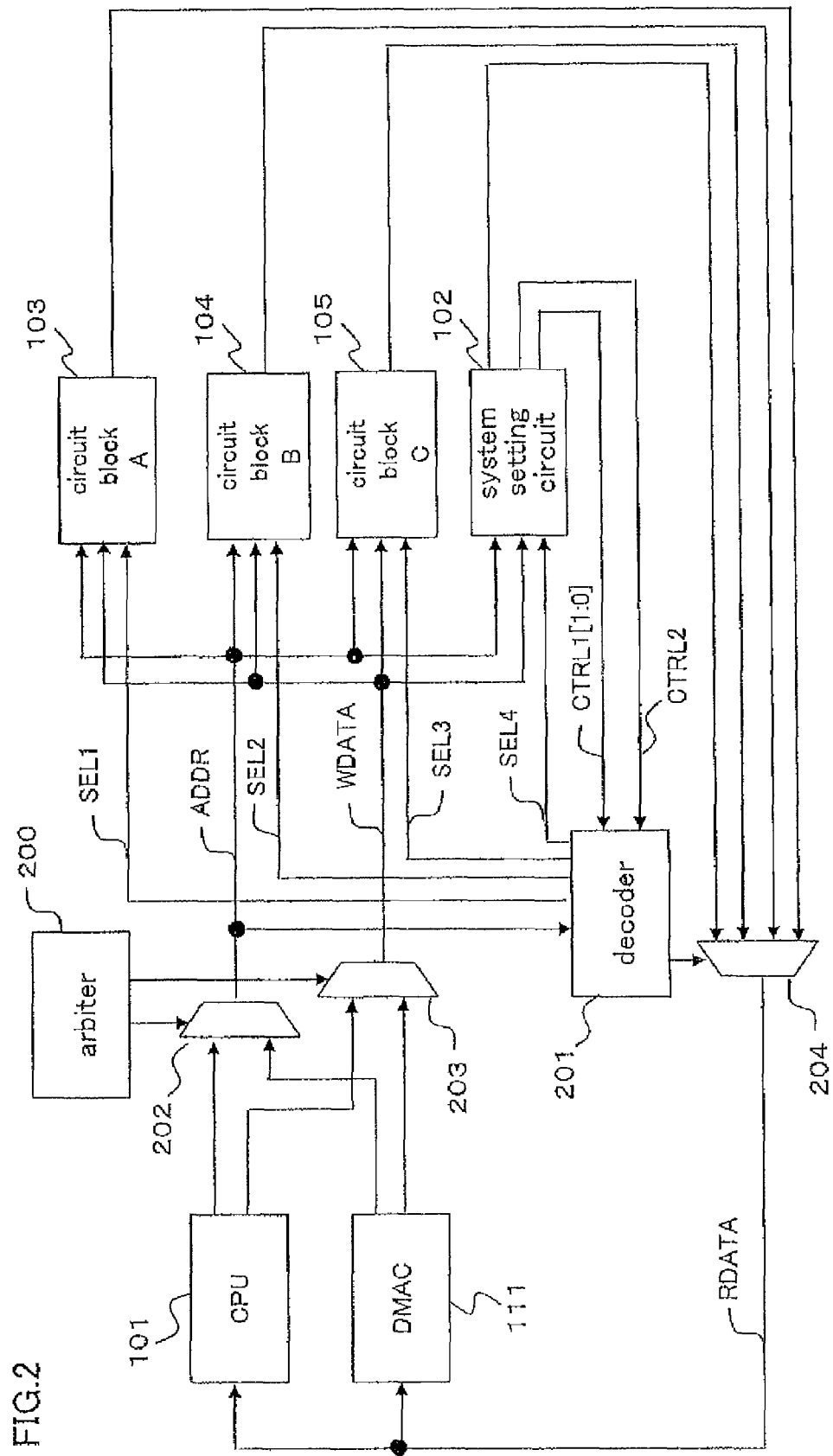
FIG. 2 is a block diagram illustrating a bus system in the large-scale integrated circuit according to Embodiment 1 in detail shown in FIG. 1.

Hereinafter, the large-scale integrated circuit 100 according to Embodiment 1 will be further described with reference to FIG. 2 illustrating an example of a bus system in detail as a specific example.

That is, FIG. 2 is a diagram illustrating an example of a bus system as the bus system 106 described above, illustrating an example that achieves the large-scale integrated circuit of the embodiment using this bus system.

The bus system 106 connects by a centralized arbiter and centralized decoder system between the CPU and a DMAC (Direct Memory Access Controller), both of which are functioning as a master block, the circuit blocks A, B and C functioning as a slave block, and the system setting circuit 102. Note that FIG. 1 does not illustrate the DMAC described above, however, FIG. 2 illustrates the DMAC as a more specific configuration of the LSI according to Embodiment 1.

Herein, the bus system 106 provides an address signal (ADDR signal) and a writing data signal (WDATA signal) from the CPU 101 and the DMAC 111 to the circuit blocks A to C and the system setting circuit 102; and further, provides a read-out data signal (RDATA signal) read out from the circuit blocks A to C and the system setting circuit 102 to the CPU 101 and the DMAC 111.

The bus system 106 includes a selector 202 for selecting an ADDR signal from the CPU 101 and the DMAC 111, a selector 203 for selecting a WDATA signal from the CPU 101 and the DMAC 111, and an arbiter 200 for controlling the selectors. The output of the selectors 202 and 203 is provided to the circuit blocks A to C and the system setting circuit 102.

In addition, the bus system 106 includes a decoder 201 for decoding an ADDR signal selected at the selector 202 and outputting a selection signal SEL1 to SEL4 respectively to the circuit blocks A to C and the system setting circuit 102, and a selector 204 for selecting the read-out data signal (RDATA signal) outputted from the circuit blocks A to C and the system setting circuit 102 based on a signal from the decoder 201. Herein, the decoder 201 controls the selector 204 described above based on the two commands (first and second commands) from the system setting circuit 102 to select one of the read-out data signals (RDATA signal) outputted from the circuit blocks A to C and the system setting circuit 102. The selected RDATA signal is provided to the CPU and DMAC 111 described above.

An operation will be described next.

Among addresses and writing data outputted from a plurality of master blocks (CPU 101 and DMAC 111 according to FIG. 2), the address data and writing data outputted from one master block (also referred to as a bus master circuit, hereinafter) are selected by the selectors 202 and 203, and they are transmitted to each slave block (also referred to as a slave circuit, hereinafter) as an ADDR signal (address signal) and a WDATA signal (writing signal). At this stage, the arbiter 200 determines whether an output is selected from either bus master circuits. Although not illustrated in FIG. 2, it is common that information such as a control signal for switching reading and writing is transmitted from the bus master circuit to the slave block in the same method for the ADDR signal and the WDATA signal.

The ADDR signal is transmitted to each slave block, and at the same time, is transmitted to the decoder circuit 201. The slave selection signals SEL1 to SEL4 are outputted from the decoder circuit 201 in accordance with the address signal. Normally, one of the slave selection signals SEL1 to SEL4 becomes enabled and other selection signals become disabled in accordance with the address signal.

Figure 9:
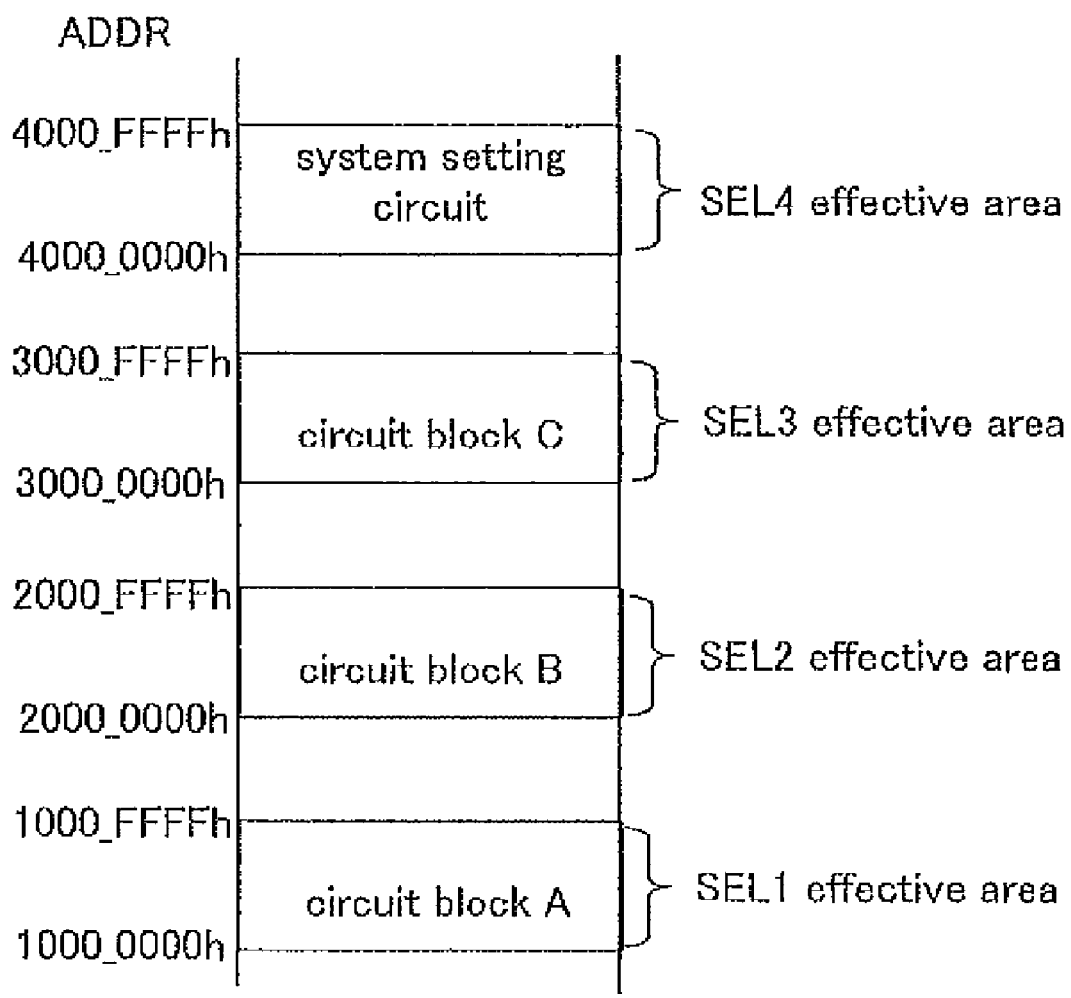
FIG. 9 is a diagram illustrating a large-scale integrated circuit according to Embodiment 1, indicating an exemplary memory map of each circuit block in the large-scale integrated circuit.

FIG. 9 is a diagram illustrating one example of correspondence of ADDR signals and the SEL signals (slave selection signals). Herein, the address value indicated by the ADDR signals is expressed by hexadecimal. In this example, only the selection signal SEL1 is enabled when the high 16 bits of the ADDR signal is 1000 h, only the selection signal SEL2 when 2000 h, only the selection signal SEL3 when 3000 h, and only the selection signal SEL4 when 4000 h. A slave circuit selected by the selection signal performs a process such as writing data by a WDATA signal and outputting a read-out data as an RDATA signal.

Finally, the output of an enabled slave circuit is selected by the selector 204 among the plurality of slave circuits and is transmitted to the master side as the RDATA signal.

In such an example of the bus system, the system setting circuit 102 outputs the two kinds of control signals in the following to the decoder circuit 201 to achieve a new LSI according to Embodiment 1.

One of the control signals (first control signal) CTRL1 [1:0] is for selecting one of the circuit blocks A to C, which enables one SEL signal among selection signals SEL1, SEL2 and SEL3 that are output signals from the decoder 201, and forcibly disables the rest of the two SEL signals.

As a specific example, the relationship between the CTRL1 [1:0] and the SEL 1 to 3 signals is illustrated in FIG. 7. Herein, the CTRL1 [1:0] is a 2 bit signal, CTRL1 [0] is a value of the 1 bit and CTRL1 [1] is a value of the 2 bit, which are expressed by a binary number. The SELL signal is enabled when the CTRL1 [1:0]=00 b, the SEL2 signal is enabled when CTRL1 [1:0]=01 b, the SEL3 signal is enabled when CTRL1 [1:0]=10 b, and the rest of the two SEL signals are forcibly disabled in each case. The enabled SEL signal is determined as enabled when selected by the ADDR signal. The rest of the disabled two SEL signals are determined to be disabled even when selected by the ADDR signal, so that the circuit block will not be selected.

As a specific example, FIG. 10 illustrates a relationship between the ADDR signal, CTRL1 [1:0] signal, CTRL2 signal, and the SEL 1 to 4 signals.

The SEL1 signal becomes enabled only when the high 16 bits of the ADDR signal is 1000 h and the CTRL1 [1:0] is 00 b. Similarly, the SEL2 signal becomes enabled only when the high 16 bits of the ADDR signal is 2000 h and the CTRL1 [1:0] is 01 b, and the SEL3 signal becomes enabled only when the high 16 bits of the ADDR signal is 3000 h and the CTRL1 [1:0] is 10 b.

The other control signal (second control signal) CTRL2 is for selecting the SEL4 signal of the system setting circuit to be enabled or disabled.

Such a specific example is illustrated in FIG. 8. The SEL4 signal indicates being enabled when the CTRL2 signal is 0 b, and the SEL4 signal indicates being forcibly disabled when the CTRL2 signal is 1 b. The SEL4 signal becomes forcibly disabled when the CTRL2 signal indicates being disabled even in the case where the ADDR signal selects the SEL4 signal.

Specifically, the SEL4 signal is enabled only when the high 16 bits of the ADDR signal indicates 4000 h and the CTRL2 signal is 0 b (enable), as illustrated in FIG. 10.

The system setting circuit 102 has a register illustrated in FIG. 13, for example. In this example, the system setting circuit 102 has a register with an 8 bit width at the address 4000_0000 h of a memory, and the 0 bit, 1 bit, and 2 bit positions are flags for respectively controlling the CTRL1 [0] signal, the CTRL1 [1], and the CTRL2 signal. The control of these control signals is performed by writing data from a master block, such as CPU, to the address 4000_0000 h of the memory.

Figure 11:
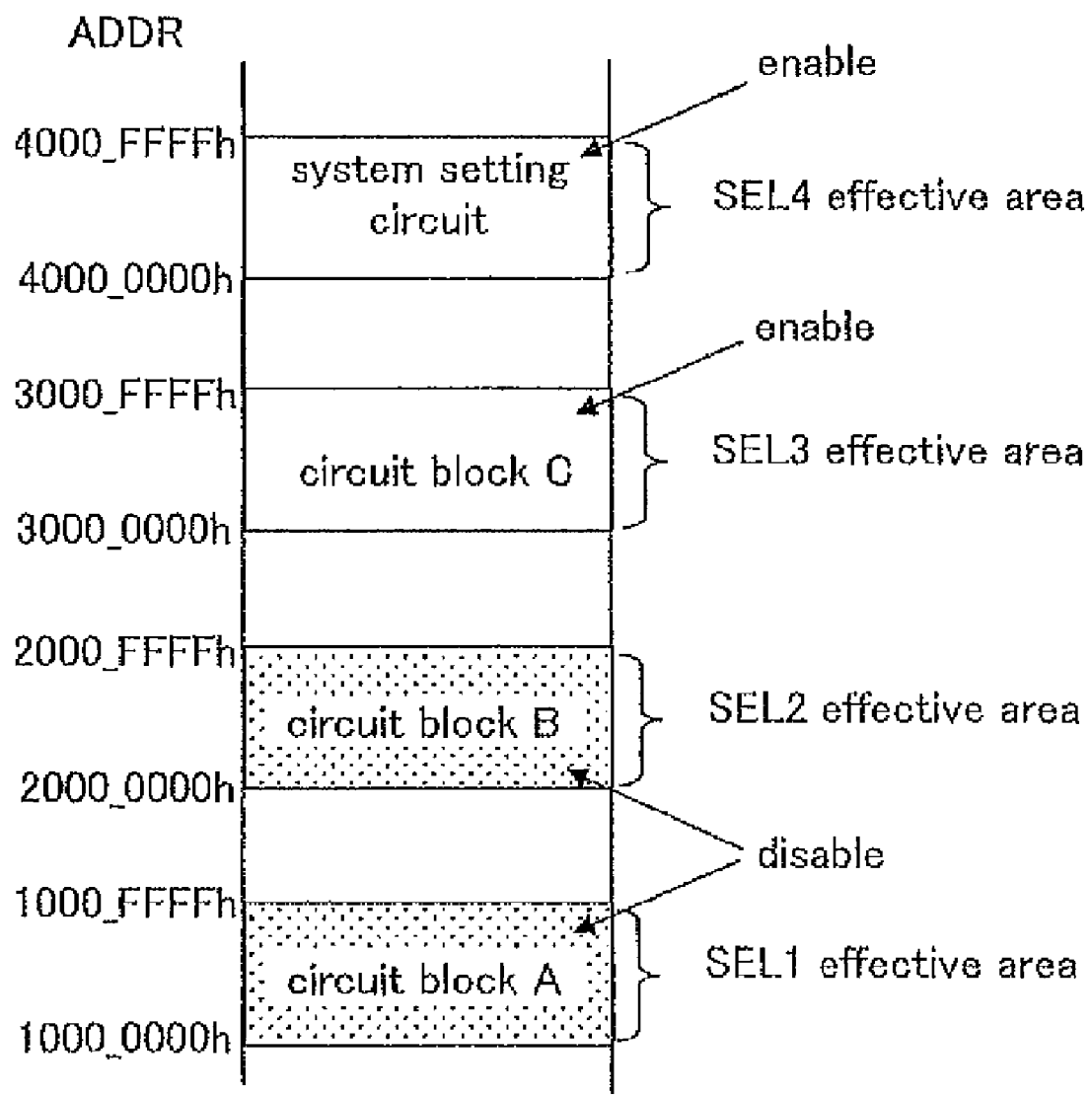
FIG. 11 is a diagram illustrating a large-scale integrated circuit according to Embodiment 1, indicating a memory map when a CTRL1 [1:0] signal is 10 b and a CTRL2 signal is 0 b.

For example, the CTRL1 [1:0] signal is set at 10 b (enabling the SEL3) and the CTRL2 signal is set at 0 b (enabling the SEL4) when 0000_0010 b is written from the CPU 101 into the address 4000_0000 h of the memory. FIG. 11 illustrates a state of a memory map at this stage.

Figure 12:
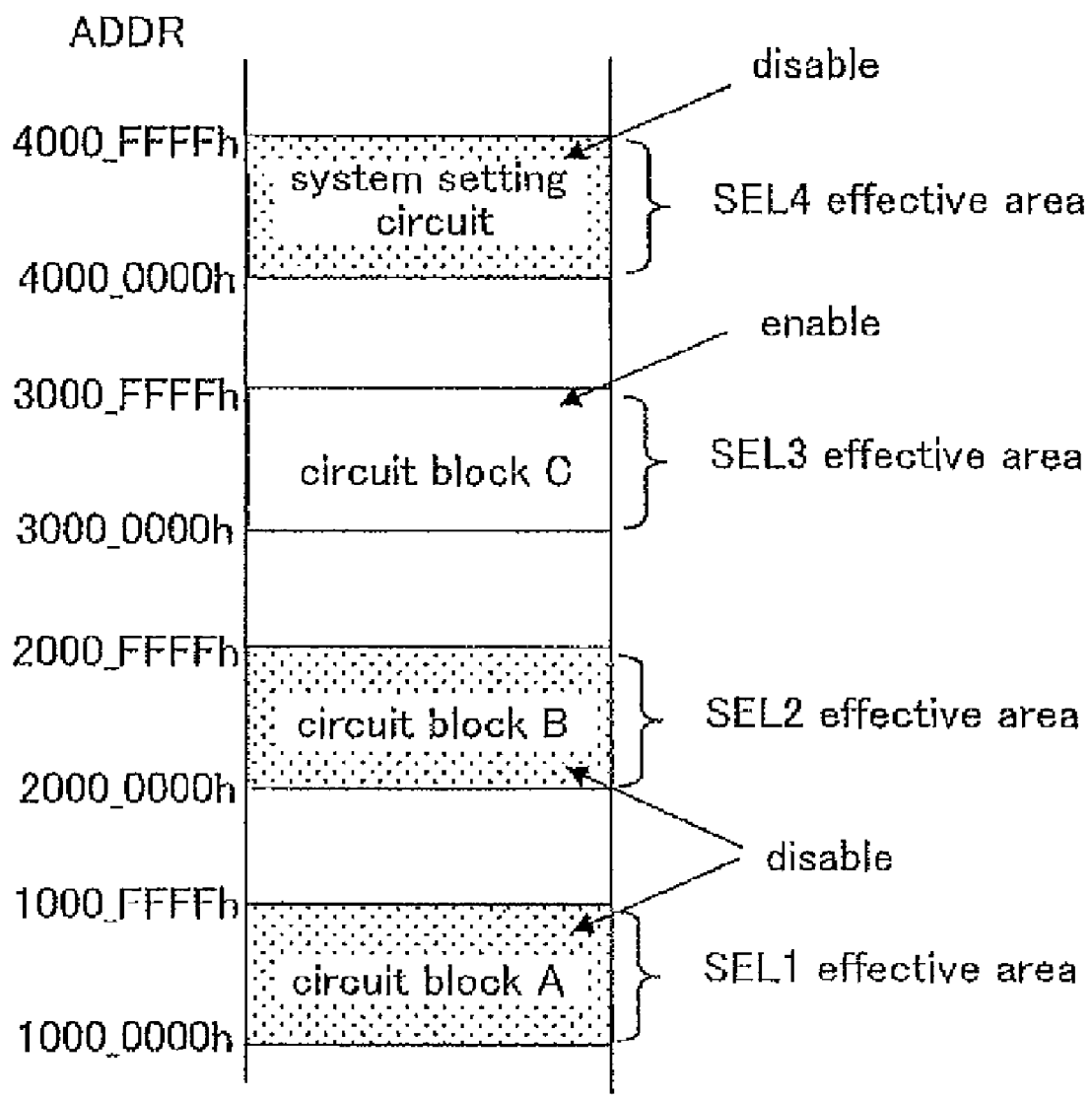
FIG. 12 is a diagram illustrating a large-scale integrated circuit according to Embodiment 1, indicating a memory map when a CTRL1 [1:0] signal is 10 b and a CTRL2 signal is 1 b.

Because the CTRL1 [10] signal is 10 b, the circuit block A and the circuit block B become disabled regardless of the value of the address, and the circuit block C is enabled. In addition, because the CTRL2 signal is 0 b, the system setting circuit 102 is enabled. Therefore, the circuit blocks accessible from the master block such as CPU are only the circuit block C and the system setting circuit 102 at this stage. Subsequently, when 0000_0110 b is written from the master memory to the address 4000_0000 h of the memory, the CTRL2 signal becomes 1 b, thereby the system setting circuit 102 turns into a disabled state as illustrated in FIG. 12. Once the system setting circuit 102 turns into a disabled state, the access to the register at the address 4000_0000 h of the memory becomes disabled. Therefore, the setting for enable/disable cannot be changed from the state in FIG. 12 after that stage. Thus, the system setting circuit itself becomes disabled by the CTRL2 signal so as to prevent the control signal CTRL1 [1:0] of the circuit blocks A to C from being unintentionally changed.

According to Embodiment 1 with the configuration described above, the large-scale integrated circuit (LSI system) 100 includes a plurality of circuit blocks A103, B104, and C105 for independently performing a signal processing operation, and a system setting circuit 102 for outputting block selecting signals (first control signals) 107, 108 and 109 to select one of the plurality of circuit blocks A to C, where the system setting circuit 102 and respective circuit blocks are connected to each other by the bus system 106, and the system setting circuit 102 is controlled by a control circuit, such as the CPU 101, connected thereto through the bus system 106. As a result, one circuit block can be selected as enabled among the plurality of circuit blocks by the command from the CPU during the circuit operation of the of the LSI. That is, after the circuit operation is started and information is analyzed from peripheral devices connected to the LSI, it is possible that appropriate circuit block is selected and executed.

Specifically, the LSI 100 according to Embodiment 1 can be set as a game machine capable of achieving a new function while maintaining backward compatibility with an existing game machine when the circuit block A in the LSI 100 of Embodiment 1 is set to be a compatible circuit having compatibility with an existing game machine and the circuit blocks B and C in the LSI 100 are set to be a new circuit for achieving the new function that does not exist in the existing game machine.

Further, the system setting circuit 102 is configured to output the selection signal (second control signal) for disabling the circuit function of the system setting circuit 102 itself by the command from a control circuit such as CPU. As a result, the block selection is rejected after the disabled block by the function for disabling the setting circuit itself. As a result, it is possible to prevent unintended circuit blocks from being selected by mistake during the operation of the LSI.

Specifically, the system setting circuit itself becomes disabled, and therefore, the changing of various selection signals is rejected after the disablement. As a result, there is no risk to change functions by mistake.

Additionally, in a case where backward compatibility is maintained but an integrated circuit in the previous generation does not have a system of the system setting circuit, the fact that the system setting circuit itself is visible on the bus is a problem for compatibility. Therefore, a complete backward compatibility can be maintained by disabling the system setting circuit itself and making it inaccessible on the bus prior to the transition to the compatibility mode.

According to Embodiment 1 as described above, one circuit block can be selected as enabled among the plurality of circuit blocks during the circuit operation, as illustrated in FIG. 1. As a result, after the circuit operation is started and information is analyzed from peripheral devices connected to the integrated circuit, it is possible that appropriate circuit block is selected and executed.

Embodiment 2

Figure 3:
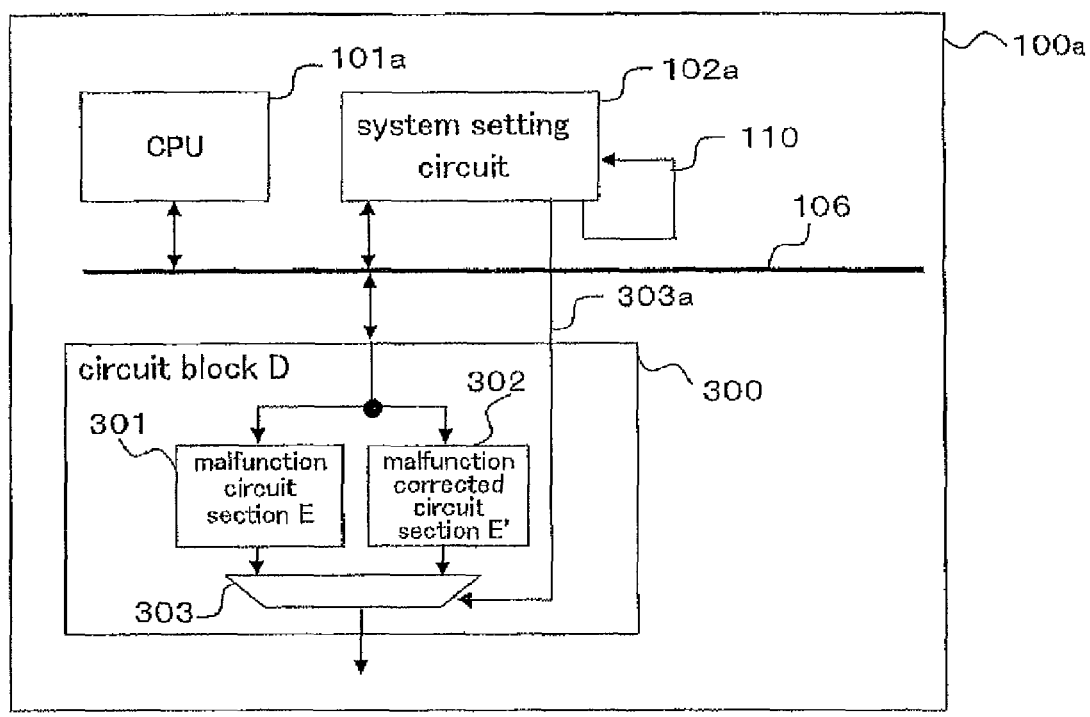
FIG. 3 is a block diagram illustrating a large-scale integrated circuit according to Embodiment 2 of the present invention.

FIG. 3 is a block diagram illustrating a large-scale integrated circuit according to Embodiment 2.

A large-scale integrated circuit 100a according to Embodiment 2 as illustrated in FIG. 3 includes a control circuit 101a such as a CPU, a system setting circuit 102a, a circuit block D 300 that is confirmed to have a malfunctioning circuit section E 301 in a large-scale integrated circuit in the previous generation, and a bus system 106 for connecting them. Herein, the circuit block D 300 includes, in addition to the malfunctioning circuit section E 301, a malfunction corrected circuit section E' 302 obtained by correcting a malfunctioning portion of the malfunctioning circuit section E 301 so as not to affect the original circuit operation of the circuit block D 300, and a selector 303 for selecting either of the output of the malfunctioning circuit section E 301 or the output of the malfunction corrected circuit section E' 302. Herein, the system setting circuit 102a is configured to output a circuit selection signal 303a for selecting either of the malfunctioning circuit section E 301 or the malfunction corrected circuit section E' 302 to the selector 303, and to further output the selection signal 110 for disabling the circuit function of itself.

The CPU 101a outputs two kinds of commands for the signals 303 and 110, to the system setting circuit 102a through the bus system 106.

Herein, one of the commands (first command) is for selecting only one of the malfunctioning circuit section E 301 or the malfunction corrected circuit section E' 302 in the circuit block D 300. Upon receiving the first command, the system setting circuit 102a changes the circuit selection signal 303 into a state with enabled malfunction correction or disabled malfunction correction.

The circuit block D 300 enables only one of the malfunctioning circuit section E 301 or the malfunction corrected circuit section E' 302 based on the state of the circuit selection signal 303, and disables the other.

Further, the other command (second command) from the CPU 101a disables the system setting circuit 102a. This is a command having the similar function as described in Embodiment 1 that is illustrated in FIGS. 1 and 2 described above.

Herein, the malfunctioning circuit section E 301 is a circuit having a malfunction of the LSI in the previous generation (the existing LSI) and having compatibility with the LSI in the previous generation (the existing LSI). In addition, the malfunction corrected circuit section E' 302 is a circuit in which the malfunction of the circuit 301 having the malfunction of the LSI in the previous generation (the existing LSI) is corrected. In addition, the circuit block D 300 includes a circuit (not shown) common in the LSI in the previous generation (the existing LSI) and the LSI in the new generation (a new LSI), in addition to the malfunctioning circuit section E 301 and the malfunction corrected circuit section E' 302. The LSI 100a according to Embodiment 2 may include a circuit common in the LSI in the previous generation (the existing LSI) and the LSI in the new generation (a new LSI), in addition to the circuit block D 300 described above.

A function and effect will be described next.

In the large-scale integrated circuit 100a with the configuration described above, it is possible using the CPU 101a to select either operating the malfunctioning circuit section E 301 in the circuit block D 300 during the operation or using the circuit section 302 with the corrected malfunction. Further, the block selection is rejected after the disablement by the function for disabling the setting circuit itself, thereby preventing an unintended circuit from being selected by mistake during the operation.

In Embodiment 2, for example, whether to use the circuit 301 having the malfunction of the LSI in the previous generation (existing LSI) or the circuit 302 with the corrected malfunction is determined by the CPU during the circuit operation as illustrated in FIG. 3. The CPU 101a outputs a command for selecting either of the malfunctioning circuit section E 301 or the malfunction corrected circuit section E' 302 to the system setting circuit 102a. Subsequently, the system setting circuit 102a outputs the circuit selection signal 303a to the selector 303 based on the command. In the selector 303, the output of either of the malfunctioning circuit section E 301 or the malfunction corrected circuit section E' 302 is selected.

Further, after such a selection operation is performed, the CPU 101a outputs to the system setting circuit 102a the selection signal 110 for disabling the system itself. Subsequently, the system setting circuit 102a sets such an operation mode that disables the circuit of itself. After the setting, the selection of the output of the malfunctioning circuit section E 301 and the output of the malfunction corrected circuit section E' 302 is impossible.

Specifically, when the LSI 100a according to Embodiment 2 is required to operate as a device having compatibility with the LSI in the previous generation, the LSI 100a flexibly uses the circuit 301 having a malfunction in the LSI in the previous generation, and when the LSI 100a according to Embodiment 2 is required to operate as the LSI in the new generation (a new LSI) the LSI 100a flexibly selects the circuit 302 with the corrected malfunction so as to improve convenience.

As a result, also in Embodiment 2, the LSI capable of achieving a new game machine having compatibility with the existing game machine can be obtained with the addition of a small circuit configuration.

Further, the system setting circuit 102 is further configured to output the selection signal 110 for disabling the circuit function of itself by the command from the control circuit such as a CPU. As a result, it is possible to prevent an unintentional circuit section from being selected between the malfunctioning circuit section and the malfunction corrected circuit section by mistake during the operation.

In Embodiment 2 with the configuration described above, it is possible to select during the circuit operation whether to use a circuit having the malfunction of the previous generation or to use the circuit with the corrected malfunction, as illustrated in FIG. 3. With this function, when an integrated circuit is required to operate as a device having compatibility with the LSI in the previous generation, the integrated circuit flexibly uses a circuit having a malfunction in the previous generation, and when the integrated circuit is required to operate as a circuit in the new generation, the integrated circuit flexibly selects the circuit with the corrected malfunction so as to improve convenience.

Embodiment 3

Figure 4:
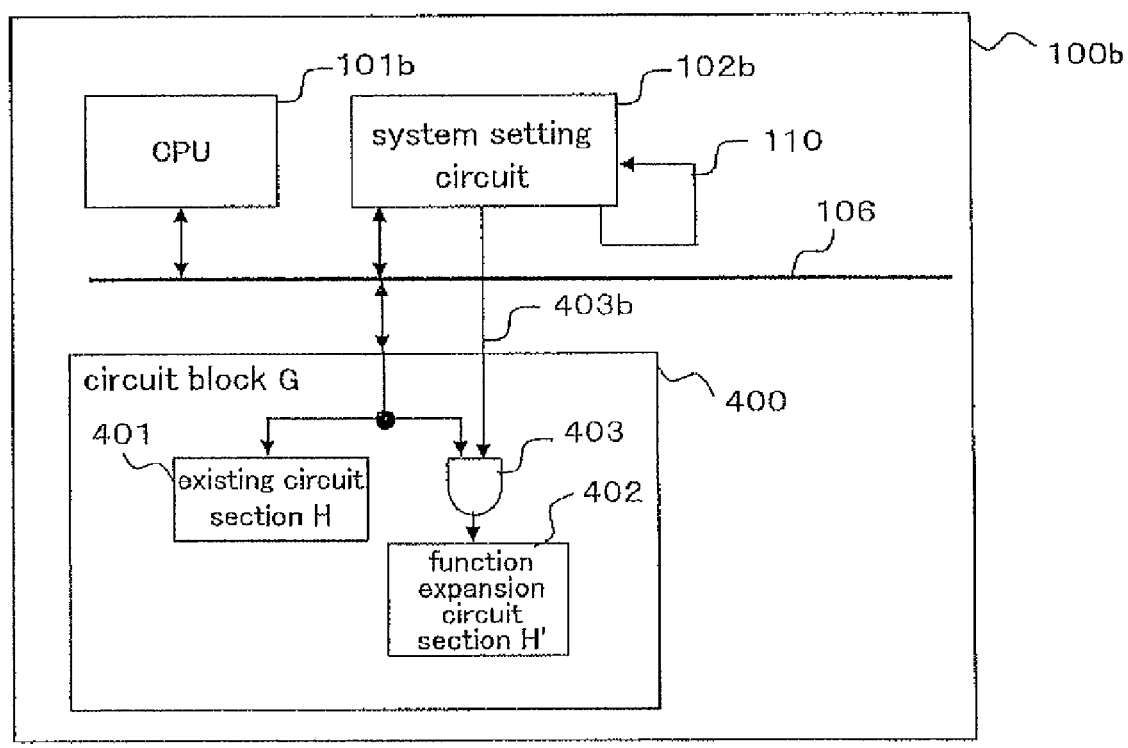
FIG. 4 is a block diagram illustrating a large scale integrated circuit according to Embodiment 3 of the present invention.

FIG. 4 is a block diagram illustrating a large-scale integrated circuit according to Embodiment 3 of the present invention.

A large-scale integrated circuit 100b according to Embodiment 3 as illustrated in FIG. 4 includes a control circuit 101b such as a CPU, a system setting circuit 102b, a circuit block G 400, and a bus system 106 for connecting them.

Herein, the system setting circuit 102b is configured to output a circuit selection signal 403b for selecting whether or not to enable a function expansion circuit section H' 402, and also to output the selection signal 110 for disabling the circuit of itself. In addition, the circuit block G 400 described above includes an existing circuit section H 401 having compatibility with a large-scale integrated circuit in the previous generation (existing LSI), a circuit section H' 402, in which functions are expanded so as not to have an undesired influence on the circuit of the existing LSI, and an AND circuit 403 for controlling the connection between the function expansion circuit section H' 402 and the bus system 106. The AND circuit 403 switches the connection state between the function expansion circuit section H' 402 and the bus system 106 based on the circuit selection signal 403b.

The CPU 101b described above outputs two kinds of commands to the system setting circuit 102b through the bus system 106 for the signals 403 and 110.

Herein, one of the commands (first command) is for selecting whether to enable or disable the function expansion circuit section H' 402 in the circuit block G 400. Upon receiving the first command, the system setting circuit 102b changes the circuit selection signal 403b into a state with an enabled function expanding circuit or a disabled function expanding circuit.

The circuit block G 400 determines whether to enable or disable the function expansion circuit section H' 402 based on the state of the circuit selection signal 403b.

In this embodiment, the signal from the bus system 106 is masked by the AND circuit having the circuit selection signal 403b as an input so as to achieve a configuration that determines whether the function expansion circuit section H' 402 described above is enabled or disabled.

Further, the other command (second command) from the CPU 101b is for disabling the system setting circuit 102 itself. This is a command having the similar function as described in the embodiment that is illustrated in FIGS. 1 and 2 described above.

Herein, the circuit block G 400 further includes a circuit (not shown) common in the LSI in the previous generation (the existing LSI) and the LSI in the new generation (a new LSI), in addition to the existing circuit section H 401 and the function expansion circuit section H' 402 described above. The LSI 100b according to Embodiment 3 may include a circuit common in the LSI in the previous generation (the existing LSI) and the LSI in the new generation (a new LSI), in addition to the circuit block G 400 described above.

A function and effect will be described next.

In the large-scale integrated circuit 100b with the configuration described above, it is possible using the CPU 101b to select whether or not to select to use the function expansion circuit in the circuit block G 400 during the operation. Further, the selection for enabling or disabling the expansion function is rejected after the disablement by the function for disabling the setting circuit itself, thereby preventing an unintended circuit from being selected by mistake.

In Embodiment 3, for example, whether to use the existing circuit H 401 having compatibility with the LSI in the previous generation (existing LSI) or to use the function expansion circuit section H' 402 for achieving a new function together with the existing circuit section H 401 is determined by the CPU during the circuit operation as illustrated in FIG. 4. The CPU 101a outputs a command in accordance with the determination result to the system setting circuit 102b. Subsequently, the system setting circuit 102b outputs the circuit selection signal 403b to the AND circuit 403 described above based on the command. The AND circuit 403 selects the use of only the existing circuit section H 401 or both of the existing circuit section H 401 and the function expansion circuit section H' 402.

Further, after such a selection operation is performed, the CPU 101b outputs to the system setting circuit 102b the selection signal 110 for disabling the system itself. Subsequently, the system setting circuit 102b sets such an operation mode that disables the circuit of itself. After the setting, the switching of the circuit for use is impossible by the AND circuit 403 described above.

Specifically, when the LSI 100b according to Embodiment 3 is required to operate as a device having compatibility with the LSI in the previous generation, the LSI 100b uses the circuit H 401 having compatibility with the LSI in the previous generation, and when the LSI 100b according to Embodiment 3 is required to operate as the LSI in the new generation (a new LSI), the LSI 100b uses both the existing circuit section H 401 and the function expansion circuit section H' 402 so as to achieve the new function.

As a result, also in Embodiment 3, the LSI that is capable of achieving a new game machine having compatibility with the existing game machine can be obtained with the addition of a small circuit configuration.

Further, the system setting circuit 102b is further configured to output the selection signal 110 for disabling the circuit function of itself by the command from the control circuit such as a CPU. As a result, it is possible to prevent an unintentional circuit section from being selected between the existing circuit section H 401 and the existing circuit section H 401 by mistake during the operation.

In Embodiment 3 with the configuration described above, it is possible as illustrated in FIG. 4 to select whether to use the existing circuit in the previous generation so as to maintain the compatibility or to expand the function for use.

Embodiment 4

Figure 5:
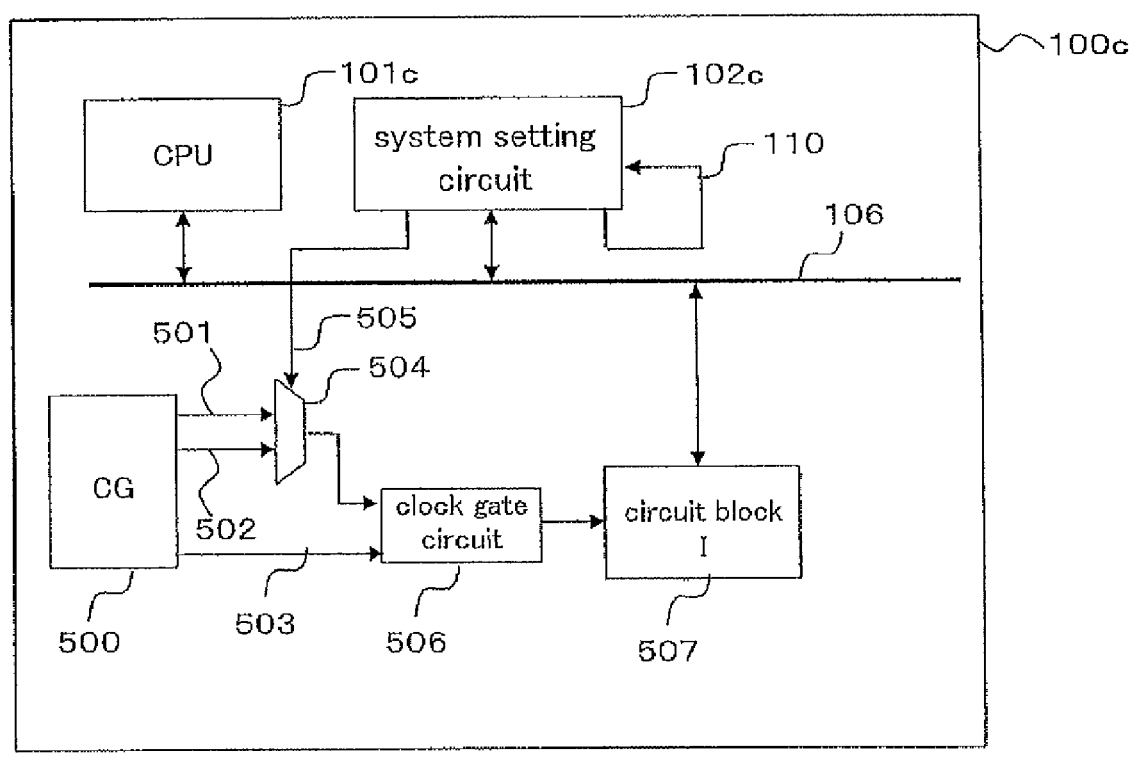
FIG. 5 is a block diagram illustrating a large-scale integrated circuit according to Embodiment 4 of the present invention.

FIG. 5 is a block diagram describing a large-scale integrated circuit 100c according to Embodiment 4 of the present invention.

The large-scale integrated circuit (LSI) 100c according to Embodiment 4 as illustrated in FIG. 5 includes a control circuit 101c such as a CPU, a system setting circuit 102c, a clock generating circuit 500, an existing circuit section I 507 compatible with a large-scale integrated circuit (existing LSI) in the previous generation, and a bus system 106 for connecting them. In addition, the LSI 100c generates a clock 503 having a predetermined frequency. Further, the LSI 100c includes a clock generating circuit 500 for generating two clock mask signals 501 and 502, a selector 504 for selecting one of the two clock mask signals 501 and 502, and a clock gate circuit 506 for lowering the frequency of the clock 503 using a selected clock mask signal. The clock, which is obtained in the clock gate circuit 506 by lowering the frequency of the clock 503, is provided to a circuit block 507 as a system clock.

Herein, based on the command from the CPU 101c, the system setting circuit 102c is configured to output a selection signal 505 to select the clock frequency for the circuit block I 507, and also to output the selection signal 110 for disabling the circuit of itself.

Further, the CPU 101c outputs two kinds of commands for each signal to the system setting circuit 102c through the bus system 106.

Herein, one of the commands (first command) is for selecting a system clock frequency to be provided to the circuit block I 507. Upon receiving the first command, the system setting circuit 102c changes the clock selection signal 505.

Further, the other command (second command) from the CPU 101c is for disabling the system setting circuit 102c itself. This is a command having the similar function as described in the embodiment that is illustrated in FIGS. 1 and 2 described above.

A function and effect will be described next.

In the large-scale integrated circuit 100c with the configuration described above, it is possible to change the system clock of a circuit block I using the CPU 101c during the operation, and to reject the change of the system clock frequency after the disablement by the function for disabling the setting circuit itself, thereby preventing an operation at an unintended frequency by mistake.

In Embodiment 4, for example, whether to operate the circuit block 507, which has compatibility with the LSI in the previous generation (existing LSI), at the operation speed of the existing LSI or at a high speed that is faster than the operation speed of the existing LSI is determined by the CPU 101c during the circuit operation as illustrated in FIG. 5. The CPU 101c outputs a command in accordance with the determination result to the system setting circuit 102c.

At this stage, the clock generating circuit 500 outputs the clock 503, which is the oscillation source of the system clock, the clock mask signal 501 for lowering the clock frequency by periodically gating the clock, and the clock mask signal 502 for masking the clock frequency to a frequency different from that of the case of the clock mask signal 501. One of the plurality of clock mask signals is selected by the selector 504 with the clock selection signal 505, and the frequency of the clock 503 is lowered at the clock gate circuit 506 based on the selected clock mask signal. Thus, it is possible to change the system clock that enters the circuit block I 507.

In addition, when backward compatibility needs to be maintained in the LSI 100c, one of the clock mask signals outputted from the clock generating circuit 500 will be a mask signal that is associated with the system clock provided to the circuit block I in the large-scale integrated circuit in the previous generation.

Further, after such a selection operation is performed, the CPU 101c outputs to the system setting circuit 102c the selection signal 110 for disabling the system itself. Subsequently, the system setting circuit 102c sets such an operation mode that disables the circuit of itself. After the setting, it is impossible to change the frequency of the clock 503 described above.

That is, when the LSI 100c according to Embodiment 4 is required to operate as a device having compatibility with the LSI in the previous generation, the LSI 100c operates the circuit block 507 having the compatibility with the LSI in the previous generation at the operation speed of the existing LSI. Further, when the LSI 100c operates at a high speed that is faster than the operation speed of the existing LSI, the LSI 100c provides a clock with a higher frequency to the circuit block 507.

As a result, it is possible in Embodiment 4 to operate the circuit block 507 having the compatibility with the LSI in the previous generation at the operation speed of the existing LSI and at the speed faster than the operation speed of the existing LSI by the addition of a small circuit configuration.

Further, the system setting circuit 102c is configured to output the selection signal 110 for disabling the circuit function of itself by the command from the control circuit such as a CPU, so that it is possible to prevent the frequency of the clock provided to the circuit block 507 from being changed during the operation of the LSI by mistake.

According to Embodiment 4 with the configuration described above, it is possible to change the system clock frequency of the circuit block as illustrated in FIG. 5.

Additionally speaking, as the manufacturing process for integrated circuits generally goes into details year by year, it is possible to increase the operation frequency of circuits though such a frequency has not been changed conventionally in view of the compatibility. However, in the embodiment of the present invention, a system clock having the same clock frequency with the previous generation is used when a circuit is operated as an integrated circuit having the compatibility, and a double speed clock, for example, is used as a system clock when the circuit is operated as a circuit in a new generation. As a result, it is possible to improve the processing throughput per unit time of the circuit block.

Embodiment 5

Figure 6:
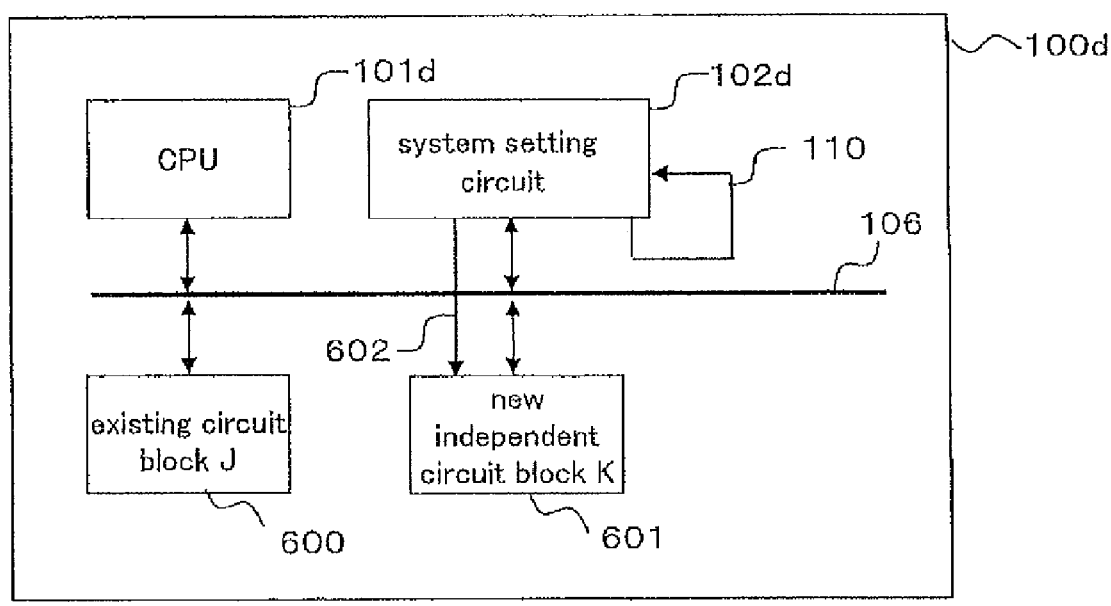
FIG. 6 is a block diagram illustrating a large-scale integrated circuit according to Embodiment 5 of the present invention.

FIG. 6 is a block diagram illustrating a large-scale integrated circuit according to Embodiment 5 of the present invention.

A large-scale integrated circuit 100d according to Embodiment 5 as illustrated in FIG. 6 includes a control circuit 101d such as a CPU, a system setting circuit 102d, an existing circuit block J 600 having a large-scale compatibility with a large-scale integrated circuit in the previous generation (existing LSI), a new independent circuit block K 601 designed not to provide an undesired influence to the existing circuit and equipped with a new function different from the function of the existing LSI, and a bus system 106 for connecting them.

Herein, the system setting circuit 102d is configured to output a block selection signal 602 for selecting whether or not the new independent circuit block K 601 is enabled, and also to output the selection signal 110 for disabling the circuit of itself.

The CPU 101d outputs two kinds of commands for each signal to the system setting circuit 102d through the bus system 106.

Herein, one of the commands (first command) is for selecting whether to enable or disable the circuit block K 601. Upon receiving the first command, the system setting circuit 102d changes the state of the block selection signal 602 into an enabled or disabled state.

The new independent circuit block K 601 determines whether to enable or disable the new independent circuit block K 601 based on the state of the circuit selection signal 602.

Further, the other command (second command) from the CPU 101d is for disabling the system setting circuit 102d itself. This is a command having the similar function as described in the embodiment that is illustrated in FIGS. 1 and 2 described above.

In addition, the LSI 100d according to Embodiment 5 includes a common circuit that is common in the LSI in the previous generation (existing LSI) and the LSI in the new generation (new LSI), in addition to the existing circuit block J 600 and the new independent circuit block K 601.

A function and effect will be described next.

The large-scale integrated circuit 100d is able to select whether or not to use the new independent circuit block K 601 during the operation using the CPU 101d. Further, the selection of enabling or disabling the new independent circuit block is rejected after the disablement by the function for disabling the setting circuit itself, thereby preventing an unintended circuit block from being selected during the operation by mistake.

In Embodiment 5, for example, whether to use the existing circuit block J 600 having compatibility with the LSI in the previous generation (existing LSI) or to use the new independent circuit block K 601 for achieving a new function is determined by the CPU 101d during the circuit operation as illustrated in FIG. 6. The CPU 101d outputs a command in accordance with the determination result to the system setting circuit 102d. Subsequently, the system setting circuit 102d outputs the command in accordance with the determination result to the new independent circuit block K 601 described above. As a result, the new independent circuit block K 601 will be either in the operational state or non-operational state.

Further, after such a selection operation is performed, the CPU 101d outputs to the system setting circuit 102d the selection signal 110 for disabling the system itself. Subsequently, the system setting circuit 102d sets such an operation mode that disables the circuit of itself. After the setting, it is impossible to change the operational state of the new independent circuit block K 601 described above.

According to Embodiment 5 with the configuration described above, the new LSI 100d is equipped with the new independent circuit, in addition to the existing circuit having compatibility, as illustrated in FIG. 6. By the judgment of the CPU, the new independent circuit is disabled when an operation is performed maintaining the compatibility, and the new independent circuit is enabled when the integrated circuit is operated as a function in the new generation. Therefore, it is possible for the new LSI 100*d* to switch between the state maintaining the compatibility with the existing LSI and the state performing the new function based on the signal from a peripheral device during the LSI operation. Further, in the new LSI 100*d*, circuit blocks other than the existing circuit block J 600 and the new independent circuit block K 601 are shared both in the state maintaining the compatibility with the existing LSI and the state performing the new function, so that the new LSI, which maintains the compatibility with the existing LSI while being capable of performing the new function, can be achieved with the addition of the small circuit configuration.

In Embodiment 5 with the configuration described above, the new independent circuit is prepared, which is totally different from the existing circuit having compatibility. This new independent circuit is disabled when the operation for maintaining the compatibility is performed, and the new independent circuit is enabled when the integrated circuit is operated as a function in the new generation.

As described above in each of the embodiments, the present invention is capable of achieving a new function using the existing circuit, and therefore, the new function can be achieved while maintaining backward compatibility with the addition of the small sized circuit.

Further, the setting of the selection controlling circuit of the present invention can be changed from a control circuit such as a CPU, in which the software operates, so that the merit is that the circuit state of the LSI can be changed upon examining the media inserted into a DVD drive, for example, is whether game software for the old game machine or game software for the new game machine after the LSI system is started.

In addition, according to the present invention, the compatible circuit and the new circuit are not required to be implemented totally independently, and circuits having similar functions (e.g., an interface circuit and a TV output circuit for a DVD drive) can be shared by the old game machine and the new game machine.

Further, according to the present invention, an expanded circuit only has to be added to the old circuit to share many portions of the old circuit for a circuit having not totally but substantially the same function (e.g., a circuit having a small expansion provided therein such as adding two key input terminals in the new game machine compared to the old game machine). As a result, a new game machine can be achieved with the addition of a small circuit, compared to the case where totally independent compatible circuit and a new circuit are included.

Further, according to the present invention, the system setting circuit itself can be disabled, so that the change of the operation mode of the LSI is rejected after the disablement. As a result, there will be no risk if the function (operation mode) is changed imprudently.

Further, in a case where backward compatibility is maintained but an integrated circuit in the previous generation does not have a system of the system setting circuit, the fact that the system setting circuit itself is visible on the bus is a problem for compatibility. Therefore, a complete backward compatibility can be maintained by disabling the system setting circuit itself and making it inaccessible on the bus prior to the transition to the compatibility mode.

As described above, it is obvious that the present invention provides a large-scale integrated circuit that achieves a new function while maintaining backward compatibility with the existing circuit with the addition of the small sized circuit.

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a large-scale integrated circuit. The present invention provides a large-scale integrated circuit that is capable of achieving a new function while maintaining backward capability with the existing circuit by adding a small circuit and is capable of preventing malfunctioning due to switching between a compatible operation mode and a new operation mode in the existing circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A large-scale integrated circuit, comprising:
   a plurality of functional blocks, each block being operable to independently perform an associated signal processing operation; and
   a selection controlling circuit operable to generate a first control signal to select one of the plurality of functional blocks to be able to provide an output,
   wherein the selection controlling circuit includes a control signal generating circuit operable after the selection of the one of the plurality of functional blocks to generate a second control signal to disable the operation of the selection controlling circuit so that the selection controlling circuit is no longer able to generate the first control signal during operation of the large-scale integrated circuit; and
   wherein the selection controlling circuit generates the first and the second control signals in response to a command from a different control circuit.

2. A large-scale integrated circuit according to claim 1, further including:
   a central processing unit as the different control circuit; and
   a bus system for connecting the central processing unit and the selection controlling circuit.

3. A large-scale integrated circuit according to claim 2, wherein the plurality of functional blocks are circuit blocks that are connected to the selection controlling circuit and the central processing unit through the bus system.

4. A large-scale integrated circuit according to claim 1, wherein one of the plurality of functional blocks is a circuit block for achieving a compatible circuit having compatibility with an existing large-scale integrated circuit.

5. A large-scale integrated circuit according to claim 1, wherein one of the plurality of functional blocks is a circuit block for achieving a new circuit having no compatibility with an existing large-scale integrated circuit.

6. A large-scale integrated circuit according to claim 1, wherein one of the plurality of functional blocks is a circuit block for achieving a common circuit function with an existing large-scale integrated circuit.

7. A large-scale integrated circuit according to claim 1,
wherein one of the plurality of functional blocks is a malfunction corrected circuit, in which an existing circuit malfunction of a particular functional block in an existing large-scale integrated circuit is corrected; and
wherein the selection controlling circuit generates the first control signal to select one of the plurality of functional blocks that provides a circuit configuration including an original circuit malfunction in the existing large-scale integrated circuit or to select the one of the plurality of functional blocks that provides a circuit configuration with the corrected circuit malfunction.

8. A large-scale integrated circuit according to claim 7,
wherein another one of the plurality of functional blocks is a malfunction non-corrected circuit that has the same circuit configuration as a particular functional block including the circuit malfunction, and
wherein the selection controlling circuit generates the first control signal to select either of the malfunction non-corrected circuit or the malfunction corrected circuit to provide the circuit configuration including an original circuit malfunction in the existing large-scale integrated circuit or the circuit configuration with the corrected circuit malfunction.

9. A large-scale integrated circuit according to claim 1,
wherein one of the plurality of functional blocks is a function expanding circuit that provides a particular circuit expansion function in an existing large-scale integrated circuit, and
wherein the selection controlling circuit generates the first control signal to select one of the plurality of functional blocks that provides the particular circuit function as is or to select one of the plurality of functional blocks that provides the particular circuit expansion function.

10. A large-scale integrated circuit according to claim 9,
wherein another one of the plurality of functional blocks is a circuit having the same circuit configuration as a circuit having the particular circuit function to provide the particular circuit function as is; and
wherein the selection controlling circuit generates the first control signal to select one of the plurality of functional blocks that provides either the particular circuit function as is or that provides the particular circuit expansion function.

11. A large-scale integrated circuit according to claim 1,
wherein one of the plurality of functional blocks is an independent functional circuit for performing a signal processing operation independent from a particular circuit in an existing large-scale integrated circuit; and
wherein the selection controlling circuit generates the first selection control signal for selecting whether or not to operate the independent functional circuit.

12. A large-scale integrated circuit according to claim 11,
wherein another one of the plurality of functional blocks is an existing circuit having the same circuit configuration with a particular circuit in an existing large-scale integrated circuit; and
wherein the different control circuit can determine to enable the existing circuit or the independent functional circuit.

* * * * *